Feb. 7, 1961    G. H. PECK ET AL    2,970,607
SAFETY SHUT-OFF DEVICE FOR HYDRAULIC BRAKES
Filed Sept. 19, 1958
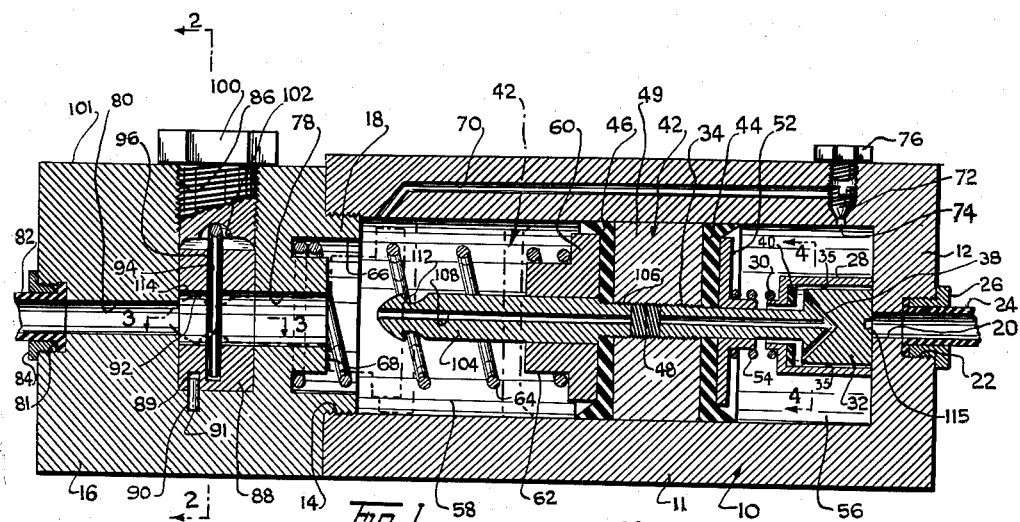
Fig. 1.
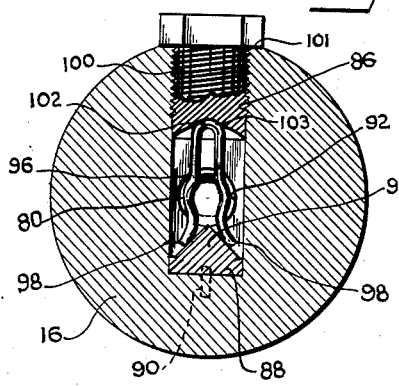
Fig. 2.
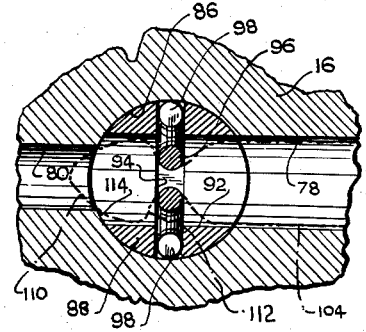
Fig. 3.
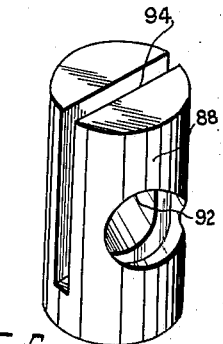
Fig. 6.
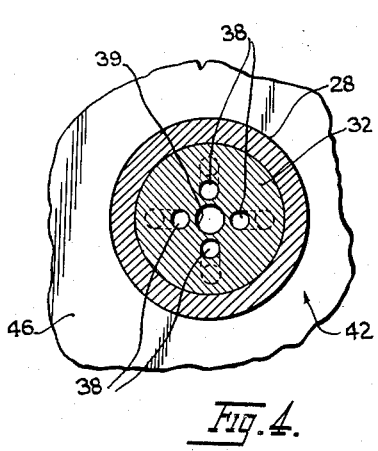
Fig. 4.
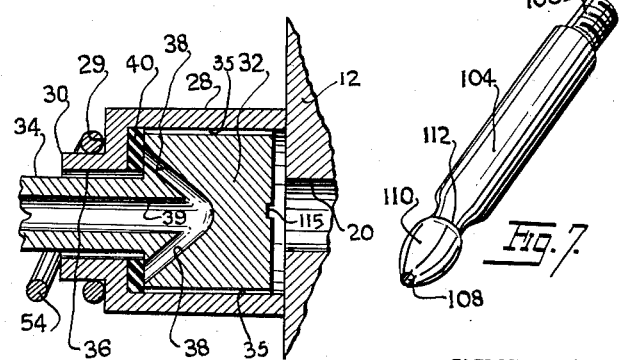
Fig. 5.  Fig. 7.
INVENTORS.
GORDON H. PECK
ANTON HASENEDER
BY
ATTORNEY United States Patent Office 2,970,607
Patented Feb. 7, 1961

2,970,607

SAFETY SHUT-OFF DEVICE FOR HYDRAULIC BRAKES

Gordon H. Peck, Box 486, and Anton Haseneder, Plains Road, both of New Paltz, N.Y.

Filed Sept. 19, 1958, Ser. No. 761,991

2 Claims. (Cl. 137—456)

This invention relates to a device adapted for incorporation in a hydraulic brake system, such as the system of an automobile vehicle, for the purpose of eliminating the danger of complete loss of braking fluid when there is a sudden rupturing of one of the hydraulic fluid lines leading to the wheels of the vehicle or of one of the brake cylinders in the wheels.

According to the present invention, a shut-off device is incorporated in the hydraulic brake system, so designed as to cause a main fluid line to be automatically shut off instantly from communication with the remaining components of the brake system, should there be a rupturing, breakage or other event causing a loss of fluid in the system.

A more particular object of the invention is to provide a safety device of the character stated which will, whenever it goes into operation to shut off communication with a master brake cylinder until such time as repairs can be made.

Another object is to so design the device as to permit it to be incorporated in a hydraulic brake system without requiring modification or redesign of said system.

It is a further object to provide a safety shut-off device useful in a device or hydraulic system where a certain quantity or pressure of fluid is required to activate the device or operate the system.

Another object is to provide a safety shut-off device of the character stated which will be sure in operation, will be comparatively inexpensive considering the benefits to be obtained from the use thereof.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a longitudinal sectional view through a device according to the present invention, as it appears when incorporated in a hydraulic brake system, inlet and outlet lines being shown fragmentarily and in section, the piston assembly being shown in its normal, retracted position in full lines, and being shown in an advanced, flow-preventing position in dotted lines.

Fig. 2 is a transverse sectional view on line 2—2 of Fig. 1, showing the safety detent means in its normal position.

Fig. 3 is an enlarged, detail sectional view on line 3—3 of Fig. 1, of the detent means, the dotted lines showing the piston assembly in a flow-preventing, advanced position engaged by the detent means.

Fig. 4 is an enlarged, detail sectional view through the compensating valve means on line 4—4 of Fig. 1.

Fig. 5 is an enlarged, detail sectional view on the same cutting plane as Fig. 1 of the compensating valve means, with the valve being shown in its closed position.

Fig. 6 is a perspective view on an enlarged scale of the holder of the detent, per se.

Fig. 7 is an enlarged perspective view of the stem of the piston assembly, per se.

Referring to the drawings in detail, the safety device comprising the present invention includes a cylindrical, elongated casing or housing generally designated 10. This casing comprises separably connected sections one of which has been designated 11. Section 11 is an elongated, hollow, cylindrically shaped member integrally formed at one end with an end wall 12. Internal threads 14 are formed in the other, open end of section 11.

The other section of housing 10 has been designated 16. This is in the form of a cylindrically shaped block having at its inner end an axial, threaded boss 18 engageable in the threaded end of section 11.

Centrally formed in wall 12 is an inlet opening or bore 20, having a threaded counterbore 22. A circumferentially lipped inlet line 24 is sealably engaged in counterbore 22 by a threaded sleeve nut 26. Of course, this is merely representative of one type of fitting for connecting a line to the device. Any of various other fittings could, of course, be employed.

Normally bearing against the inner surface of end wall 12 is a cup-shaped or cylindrical valve housing or slide 28, having at the end thereof remote from wall 12 an end wall 29 (see Fig. 5) having a center opening and an axial sleeve 30 extending about said opening and projecting away from the wall 12.

A cylindrically shaped compensating valve block 32 is slidably engaged in housing 28 and is integrally formed with an axial, elongated valve stem 34, the outer diameter of which is substantially less than the inner diameter of sleeve 30. The outer diameter of block 32 is less than the bore of housing 28. As a result, there is defined an annular passage 36 about the valve stem and an annular passage 35 about the block as clearly shown in Fig. 5. Block 32 has a plurality of valve passages 38, comprising branch passages, said passages radiating from the inner end of a main axial passage 39 formed in stem 34. Passages 38 diverge in a direction away from the wall 12, opening at their divergent ends upon the interior or valve chamber of housing 28, adjacent a resilient, annular seat 40 moutned against end wall 29 of housing 28. Passages 35 and 36 communicate with said chamber, so that when the valve is in its normal, retracted position shown in Fig. 1, passages 38 and 35, 36 are in communication with the chamber of housing 28 and hence are in communication with each other.

When, however, the valve block 32 is advanced to the Fig. 5 position thereof, the divergent ends of passages 38 are closed by the gasket or seat 40 as will be clearly seen from Fig. 5, so that there is no longer any communication between the passage 36, the branch passages 38, and passage 35.

The housing 28, the valve block, and the valve stem are all components of a piston assembly generally designated 42. Piston assembly 42 is normally in the retracted position shown in Fig. 1, but may be advanced within the hollow housing 10.

Assembly 42 includes piston cups 44, 46, said cups being centrally apertured with their center openings in registration with an axial, threaded bore 48 of a cylindrically shaped, metallic piston block 49.

Bearing against the facing or cup 44 is a flat, metal washer 52 centrally apertured to receive stem 34. Washer 52 has a center boss extending into one end of a compression, coil spring 54 circumposed about stem 34 and bearing at its other end against wall 29 in position about sleeve 30 (Fig. 5).

The piston assembly extends in position to define, at opposite sides thereof, inlet and outlet chambers 56, 58, respectively, of the housing 10. Within outlet chamber 58, a disc 60 bears against facing 46, and has an axial boss 62 extending into one end of a compression, coil spring 64, the strength of which is substantially greater than that of spring 54. Spring 64 at its other end extends into an axial recess 66 of boss 18, and within recess 66 receives a projection 68 extending from the inner end wall of recess 66. To permit "bleeding" of the device when required, there is provided a bleeder passage 70, one end of which is in continuous communication with the outlet chamber 58. At its other end, passage 70 communicates with a branch passage 74 leading to chamber 56 and also communicates with a passage leading to the atmosphere. A screw plug 76 seals the passage to the atmosphere. A so-called "bleed plug" 72 is threaded into the branch passage 74. Plug 72 has a tapered end seated in and normally closing the branch passage. After the hydraulic system is filled with fluid, the plug 76 is removed and the plug 72 unscrewed permitting air to escape from the chambers 56 and 58 through the passage 70, branch passage 74 and passage leading to the atmosphere. The plug 72 is then again screwed to its seat sealing passage 74, and the plug 76 is replaced. Removal of plug 76 permits access to the plug 72.

Generally designated at 78 is an axial passage of the block 16. This is in communication, at its inner end, with an outlet passage 80, formed with a threaded counterbore 81 at its outer, discharge end receiving the outlet line 82 which is sealably engaged in the counterbore by means of a threaded fitting 84.

In block 16 there is formed a large diameter, threaded, radial bore 86, said bore being threaded only at its outer end. The inner end of the bore extends into communication with and continues beyond the axial passage 78, and is smooth-walled. Disposed in the smooth-walled inner end of the bore, in position lying diametrically across the passage 78, is a detent retainer 88. This has the shape shown to particular advantage in Fig. 6 in which it is seen that retainer or holder 88 is of cylindrical formation, said retainer having at its lower end a small, off-center recess 89 adapted to receive a locating pin 90 that is engaged in a registering recess 91 formed in the bottom surface of the radial bore 86.

The purpose of the locating pin is to insure that the retainer or holder 88 will be properly positioned in the bore, with a diametrically extending bore or opening 92 of the retainer being in exact registration with the passage 78 to provide communication between passage 78 and outlet passage 80.

As shown to particular advantage in Fig. 6, retainer 88 has an elongated longitudinal slot 94 opening upon the upper end of the retainer and lying diametrically of the retainer. Slot 94 at its inner end continues beyond the diametrically extending opening 92, with the slot terminating short of the inner ends of the retainer 88.

A detent 96 is in the form of a length of spring wire material, having a shape such as shown in Fig. 2. Detent 96, thus, is of a hairpin or U-shape, and as shown may have outwardly, reversely bent extensions 98 at its opposite ends to insure that the detent will be properly centered within the slot 94. The detent has legs which are normally spaced closely apart within the opening 92, for a purpose to be made presently apparent.

Designated at 100 is a cap screw, comprising a closure plug for the bore 86. This is threaded into the bore, and has a wrench-receiving head disposed against a flat surface 101 of the block 16. At its inner end, the shank of the plug is concavely shaped, and centrally formed in the concave inner end surface of the shank is a recess 102 receiving the bight portion 103 of detent 96.

Piston assembly 42 includes (Figs. 1 and 7) a forwardly projecting, axially disposed, elongated piston stem 104, having a reduced axial extension 106 at its rear end threadedly engaged in opening 48. Valve stem 34 is threadedly engaged in the other end of the bore or opening 48, as clearly shown in Fig. 1.

Stem 104 has an axial bore 108 which communicates, through the provision of the bore 48, with bore 39 of the valve stem.

At its forward end, stem 104 has a forwardly tapering head 110. At the rear end of the head, there is provided a circumferential groove 112. Referring now to the dotted line positions of piston stem 104 shown in Figs. 1 and 3, when the piston stem is advanced to its maximum extent, the legs of detent 96 will engage in groove 112, in back of the head 110, near a shoulder 114 defined by the merger of opening 92 into passage 80. The diameter of passage 80 should be large enough to receive freely the end of head 110, without necessarily seating head 110 on shoulder 114. A slot 115 is provided on the end of block 32 to facilitate screwing stem 34 into block 49.

In use, the parts normally, with the brakes or other hydraulic system unloaded, appear as in Fig. 1. In this connection, the device may be incorporated in the hydraulic brake system of a vehicle at a location close to the master cylinder in the main fluid line 24 leading therefrom to the one or more branch lines in the system which terminate at brake cylinders in the wheels of a vehicle or at other pressure applying devices.

In operation of the system both chambers 56 and 58 will normally be filled with brake fluid as will be the lines 24 and 82. Upon actuation of the hydraulic system such as by applying brakes in a vehicle equipped with the present device, the pressure of fluid in the inlet chamber 56 which is closest to the master brake cylinder supplying fluid via main line 24, will rise to force valve block 49 and piston assembly 42 to the left as viewed in Fig. 1. Very little fluid passes through the small passages 38 during the short movement of stem 34 to the left which brings the outer ends of the passages 38 into abutment with gasket 40 so that these passages become sealed thereby. The continued application of braking pressure to the system as in normal operation will always occur, will force more fluid into chamber 56 as block 32 is moved away from end wall 12 along with valve housing 28. Spring 54 forces the housing 28 and gasket 40 against the end of block 32 in which open the ends of passages 38. As the fluid pressure in chamber 56 rises and block 49 moves to the left, the pressure in chamber 58 is increased so the fluid is forced therefrom into line 82 and from there to the wheel brakes or other load pressure applying device.

When pressure at the master cylinder in normal operation of the present system is released, spring 64 which has been compressed by leftward movement of block 49, expands to force block 49 and plate 60 to the right so that the size of chamber 56 is reduced and fluid therein is forced back into the main line 24 to the master cylinder. It is only at the end of the pressure release movement of assembly 42 that block 32 again abuts end wall 12. In this non-operating condition of the device, passage 58 can communicate with passage 56 through bore 108, threaded bore 48, bore 39, passages 38 and passage 36. The fluid pressure in the entire system can be equalized in this non-operating position. It should be noted that spring 54 exerts such a tension on valve housing 28, that the valve housing cannot be forced away from block 32 by back pressure from chamber 58 exerted through bores 108, 39 and the very small diameter passages 38, during normal operation of the system.

Now, if a leak should occur anywhere in the system beyond the outlet end of passage 80, in line 82 or any branch line which may be connected thereto, or in any brake cylinder connected to one of the branch lines, the pressure in chamber 58 will drop so that a reduced back pressure is exerted against plate 60 as the plate moves to the left responsive to application of pressure from the master cylinder connected to line 24. Since the assembly 42 meets with reduced or no resistance to its leftward travel except that of spring 64, stem 104 advances until head 110 becomes engaged with spring 96. This detent spring will lock in slot 112 so that the entire valve assembly is held in its extreme left position. This is the dotted line position shown in Fig. 1. The left end of boss 62 will then be in abutment with the right end of projection 68 to provide a positive stop to the leftward movement of stem 104 which is now held by spring 96 in locking engagement with head 110. No fluid can now pass from chamber 56 to chamber 58 because the compensating valve defined by valve housing 28 and block 32 has closed the avenue of communication between the chambers by pressure of gasket 40 against the openings in passages 38. Any increased pressure applied at the master cylinder cannot be communicated to chamber 58. Piston cups 44 and 46 effectively seal off chamber 56 from chamber 58, as do the compensating valve members 28 and 32.

A principal purpose of the present system is thus accomplished, which is to prevent loss of the essential fluid from the master brake cylinder upon development of leakage anywhere beyond passage 80.

If the leak which caused loss of pressure in the line 82 is repaired, the device can be put back in operation as follows: Cap 100 will be removed and spring 96 will be extracted to release stem 104. The compressed spring 64 will then force the assembly 42 to the right. Spring 96 will then be replaced in the position shown in Fig. 1 and cap 100 will also be replaced. If necessary, screw 76 may be opened to bleed the device and equalize pressure in the system.

The device has the desirable characteristic, in that it can be mounted within a conventional vehicle hydraulic brake system, without modification or redesign of existing components of said system. One need merely install the device at a suitable location in the main line near the master brake cylinder.

While we have illustrated and described the preferred embodiment of our invention, it is to be understood that we do not limit ourselves to the precise construction herein disclosed and that various changes and modifications may be made within the scope of the invention as defined in the appended claims.

Having thus described our invention, what we claim as new, and desire to secure by United States Letters Patent is:

1. A safety shut-off device for a hydraulic brake system of the type including a master cylinder and a line extending from said cylinder, said device comprising a hollow casing having a wall at one end with an inlet therein, said casing having an outlet at the other end thereof, piston means in said casing dividing the same into a fluid inlet chamber communicating with said inlet and a fluid outlet chamber communicating with said outlet, a stem projecting forwardly from the piston means in the outlet chamber toward said outlet, a locking means adjacent said outlet adapted to engage said stem for locking the piston means in an extreme forward position, and valve means providing a passage between said inlet and outlet chambers through said piston means, said valve means being adapted to close said passage on forward movement of said stem responsive to application of pressure in said inlet chamber on said piston means, said valve means comprising a valve housing and a valve block in the inlet chamber, said housing and valve block normally engaging the end wall of said casing, said valve block being secured to one end of the piston means and adapted to move in said valve housing for opening and closing said passage, said locking means comprising a generally U-shaped spring detent member with legs having outwardly bowed portions, said stem having a head with a groove portion adapted to engage in said bowed portions of the spring detent member, said casing having a radial bore, said spring detent member disposed in said bore, a plug removably disposed in said bore and engaging the bight of the detent member, said detent member being removable and replaceable through said bore upon removal of said plug, said piston means having a forwardly extending block in said outlet chamber, a first coil spring engaged on said block and seated on a forward end of said outlet chamber for retracting said piston means upon disengagement of said spring detent member from the head of the stem to its normal position, said piston means carrying a washer at the forward end of said inlet chamber, another coil spring weaker than the first spring seated on said washer and engaging said valve housing for moving said housing to normal position against the end wall of the casing in the normal position of the piston, said valve housing being a cup-shaped member having an internal diameter greater than the external diameter of said valve block to define an annular passage normally communicating with the inlet chamber, said valve block having a plurality of short, narrow passages therein extending inwardly and laterally from the face of the block to the axis thereof, said passages connected to each other at their inner ends and connected to said annular passage, and a valve element in the housing engageable with the face of the block to close the passage therein, said valve block having a forwardly extending stem with a bore therethrough communicating with the inner ends of the block passages, the first-named stem having a bore communicating with the bore in the forwardly extending stem, so that the first-named passage between the inlet and outlet chambers is defined by the bores in the stems, the short narrow passages in the valve block and said annular passage, said other coil spring moving said housing valve element into engagement with said valve block in the forward position of said piston to close the passages in the valve block.

2. A safety shut-off device for a hydraulic brake system of the type including a master cylinder and a line extending from said cylinder, said device comprising a hollow casng having a wall at one end with an inlet therein, said casing having an outlet at the other end thereof, piston means in said casing dividing the same into a fluid inlet chamber communicating with said inlet and a fluid outlet chamber communicating with said outlet, a stem projecting forwardly from the piston means in the outlet chamber toward said outlet, a locking means adjacent said outlet adapted to engage said stem for locking the piston means in an extreme forward position, and valve means providing a passage between said inlet and outlet chambers through said piston means, said valve means being adapted to close said passage on forward movement of said stem responsive to application of pressure in said inlet chamber on said piston means, said valve means comprising a valve housing and a valve block in the inlet chamber, said housing and valve block normally engaging the end wall of said casing, said valve block secured to one end of the piston means and adapted to move in said valve housing for opening and closing said passage, said locking means comprising a generally U-shaped spring detent member with legs having outwardly bowed portions, said stem having a head with a groove portion adapted to engage in said bowed portions of the spring detent member, said casing having a radial bore, said spring detent member disposed in said bore, a plug removably disposed in said bore and engaging the bight of the detent member, said detent member being removable and replaceable through said bore upon removal of said plug, said piston means having a forwardly extending block in said outlet chamber, a first coil spring engaged on said block and seated on a forward end of said outlet chamber for retracting said piston means upon disengagement of said spring detent member from the head of the stem to its normal position, said piston means carrying a washer at the forward end of said inlet chamber, another coil spring weaker than the first spring seated on said washer and engaging said valve housing for moving said housing to normal position against the end wall of the casing in the normal position of the piston, said valve housing being a cup-shaped member having an internal diameter greater than the external diameter of said valve block to define an annular passage normally communicating with the inlet chamber, said valve block having a plurality of short, narrow passages therein extending inwardly and laterally from the face of the block to the axis thereof, said passages connected to each other at their inner ends and connected to said annular passage, said valve block having a forwardly extending stem with a bore therethrough communicating with the inner ends of the block passages, the first-named stem having a bore communicating with the bore in the forwardly extending stem, so that the first-named passage between the inlet and outlet chambers is defined by the bores in the stems, the short, narrow passages in the valve block and said annular passage, said valve housing having a gasket in the path of movement of the valve block for closing the passages in the block, the first coil spring being adapted to move said valve block to normal position away from the valve housing for opening the passages in the block, said other coil spring moving said housing into engagement with said valve block in the forward position of said piston to close the passages in the valve block, said casing having a bleeder passage having one end communicating with the outlet chamber, the other end of said bleeder passage communicating with a branch passage leading to the inlet chamber, and a removable plug in said branch passage normally closing the same.

References Cited in the file of this patent

UNITED STATES PATENTS

| | | |
|---|---|---|
| 1,905,077 | Walker | Apr. 25, 1933 |
| 2,090,299 | Kuhnle | Aug. 17, 1937 |
| 2,441,040 | Sprague | May 4, 1948 |